(12) United States Patent
Pao (10) Patent No.: US 6,208,506 B1
(45) Date of Patent: Mar. 27, 2001

(54) SPACE SAVING CD-ROM/DVD DRIVE MECHANISM USED WITH ELECTRONIC DEVICES

(76) Inventor: Gei-Jon Pao, 18242 Pamela Pl., Villa Park, CA (US) 92861

( * ) Notice: Subject to any disclaimer, the term of this patent is extended or adjusted under 35 U.S.C. 154(b) by 0 days.

(21) Appl. No.: 09/314,776

(22) Filed: May 19, 1999

(51) Int. Cl.[7] ............................................. G11B 7/00
(52) U.S. Cl. .................. 361/683; 361/725; 361/680; 369/75.1
(58) Field of Search ...................... 361/683, 680–682, 361/724–727; 360/97.01; 369/75.1

(56) References Cited

U.S. PATENT DOCUMENTS

| | | |
|---|---|---|
| 5,243,495 | 9/1993 | Read et al. . |
| 5,363,273 | 11/1994 | Ma . |
| 5,436,857 | 7/1995 | Nelson et al. . |
| 5,495,586 | 2/1996 | Adachi et al. . |
| 5,572,399 * | 11/1996 | Shirato et al. ........................ 361/680 |
| 5,606,732 | 2/1997 | Vignone, Sr. . |
| 5,701,230 * | 12/1997 | Liang et al. .......................... 361/681 |
| 5,712,763 | 1/1998 | Bullister . |
| 5,717,569 | 2/1998 | Jondrow . |
| 5,724,274 | 3/1998 | Nelson et al. . |
| 5,739,995 | 4/1998 | Ohmi et al. . |
| 6,016,248 * | 1/2000 | Anzai et al. .......................... 361/683 |
| 6,069,858 * | 5/2000 | Endo et al. .......................... 369/75.1 |

* cited by examiner

Primary Examiner—Leo P. Picard
Assistant Examiner—Hung Van Duong
(74) Attorney, Agent, or Firm—Thomas I. Rozsa; Tony D. Chen; Jerry Fong (57) ABSTRACT

A space saving CD-ROM/DVD drive mechanism used with an electronic device, such as a portable notebook computer, a handheld global positioning system (GPS) or etc. The space saving CD-ROM/DVD drive mechanism comprises an optical head and a spindle motor, where the spindle motor is located adjacent to the periphery of the electronic device. The space saving CD-ROM/DVD drive mechanism takes up a small ¼ area on the electronic device, and thereby saves space on the electronic device for other computer accessories to be added.

23 Claims, 6 Drawing Sheets

SPACE SAVING CD-ROM/DVD DRIVE MECHANISM USED WITH ELECTRONIC DEVICES

BACKGROUND OF THE INVENTION

1. Field of the Invention

The present invention generally relates to the field of electronic devices. More particularly, the present invention relates to the field of portable computing devices having a space saving mechanism for CD-ROM/DVD drives, magneto-optical drives, floppy drives, etc.

2. Description of the Prior Art

Specifically, CD-ROM/DVD drives are well known in the art. Most desktop computers have these devices equipped with the computer. However, many handheld devices and mini notebook computers do not have enough space to equip the CD-ROM/DVD drives thereto. Therefore, many external connection mechanisms have been implemented with the handheld devices and mini notebook computers. The problem with this is that it is cumbersome to carry the external connection mechanism around with the handheld devices and mini notebook computers. The purpose of the handheld device is to save space. However, the disadvantage with this space saving feature is limited functionality. A handheld device, i.e., a global positioning system (GPS) has limited memory to accommodate all of the applications it uses. It is not practical to carry a handheld GPS with a cable connecting it to an external CD-ROM/DVD drive with a worldwide map library.

The following nine (9) prior art patents are found to be pertinent to the field of the present invention:

1. U.S. Pat. No. 5,243,495 issued to Read et al. on Sep. 7, 1993 for "Removable Enclosure Housing A Rigid Drive" (hereafter the "Read Patent");

2. U.S. Pat. No. 5,363,273 issued to Ma on Nov. 8, 1994 for "Computer System With Removable Floppy Disk Drive And Expansion Slot Assembly Mounted Flush In One Corner" (hereafter the "Ma Patent");

3. U.S. Pat. No. 5,436,857 issued to Nelson et al. on Jul. 25, 1995 for "Personal Computer Module Systems And Method Of Using" (hereafter the "'857 Nelson Patent");

4. U.S. Pat. No. 5,495,586 issued to Adachi et al. on Feb. 27, 1996 for "Computer Systems Having Memory Card/Disk Storage Unit Used As External Storage Device" (hereafter the "Adachi Patent");

5. U.S. Pat. No. 5,606,732 issued to Vignone, Sr. on Feb. 25, 1997 for "Direct Connect Radio And Antenna Assembly" (hereafter the "Vignone Patent");

6. U.S. Pat. No. 5,712,763 issued to Bullister on Jan. 27, 1998 for "Compatible Internal And External Card Slot System For A Portable Computing Device Having A Connector Offset Between Opposing Side Walls" (hereafter the "Bullister Patent");

7. U.S. Pat. No. 5,717,569 issued to Jondrow on Feb. 10, 1998 for "Ejection And Insulation Jacket For A Removable Component In A Portable Computing Device" (hereafter the "Jondrow Patent");

8. U.S. Pat. No. 5,724,274 issued to Nelson et al. on Mar. 3, 1998 for "Personal Computer Module System And Method Of Using" (hereafter the "'274 Nelson Patent"); and 9. U.S. Pat. No. 5,739,995 issued to Ohmi et al. on Apr. 14, 1998 for "Detachable Magnetic Disk Apparatus" (hereafter the "Ohmi Patent").

The Read Patent discloses a removable enclosure housing for a rigid disk drive. The removable self-contained rigid disk drive has a head and disk assembly (HDA), and a controller enclosed by top and bottom covers. The self-contained rigid disk drive is externally dimensioned to be removably installable in a disk bay of the same form factor. The HDA components are mounted on one side of a composite plastic-steel base, and the controller is attached to the other side. The controller has an electrical interface for connecting the drive with a host computer systems with a complementary electrical interface. The covers of the drive are made of metal to reduce electromagnetic interference when the drive is in operation.

The Ma Patent discloses a computer system with a removable floppy disk drive and expansion slot assembly detachably fastened to a recessed hole on the computer system. The floppy disk drive and expansion slot assembly has a side rail engaged into a mounting groove on one vertical side wall of the recessed hole of the computer system, two connectors electrically and respectively connected to two respective connectors on the computer system, and a slot for inserting a floppy disk or an expansion card.

The '857 Nelson Patent discloses a personal computer (PC) module system and method of using same. The system includes a common processor, and a hard drive and memory, where a user simply plugs the processor and hard drive and memory into either a portable PC base unit or a desktop PC base unit, enabling operation of the combined units as a complete data processing system. The module is readily removable to be plugged into another base unit or to be carried elsewhere.

The Adachi Patent discloses a computer system which includes a memory card/disk storage unit used as an external storage device.

The Vignone Patent discloses a direct connect radio and antenna assembly.

The Bullister Patent discloses a compatible internal and external card slot system for a portable computing device which has a connector offset between opposing sidewalls.

The Jondrow Patent discloses an ejection and insulation jacket for a removable component in a portable computing device. It facilitates installation and removal of a component, such as a memory drive, and to mechanically insulate the component.

The '274 Nelson Patent discloses a personal computer (PC) module system and method of using it. The system includes a common processor, and a hard drive and memory, where a user simply plugs the processor and hard drive and memory into either a portable PC base unit or a desktop PC base unit, enabling operation of the combined units as a complete data processing system.

The Ohmi Patent discloses a detachable magnetic disk apparatus. It comprises a magnetic disk, magnetic heads for recording and reproducing information to and from the magnetic disk, disk driving means for driving the magnetic disk, head driving means for driving the magnetic heads, a mechanical portion driving circuit for operating the disk driving means and the head driving means, and logical operation means for exchanging signals between the magnetic heads and the mechanical portion driving circuit. The apparatus further comprises a first box for containing at least the magnetic disk, the magnetic heads, the disk driving means and the head driving means, and a second box detachably connected to the first box for containing at least the logical operation means, wherein signals are exchanged between the first box and the second box.

Most conventional CD-ROM/DVD drives have a media tray for a user to place a media disc thereon, an optical head for reading the media disc and a spindle motor for turning the media disc. However, by eliminating the media tray, a space saving CD-ROM/DVD drive mechanism is created without the media tray, and thereby allows the electronic devices, such as handheld devices, mini notebook computers, etc., to be equipped with CD-ROM/DVD drives without increasing the size of the electronic devices. The size of the CD-ROM/DVD drive can be further reduced if they implement the space saving CD-ROM/DVD drive mechanism.

It is highly desirable to have a very efficient and also very effective design and construction of a space saving CD-ROM/DVD drive mechanism for electronic devices, such as handheld devices, portable computers and etc., without increasing the size of the electronic devices.

SUMMARY OF THE INVENTION

The present invention is a space saving CD-ROM/DVD drive mechanism used with an electronic device, such as a mini notebook computer, a handheld global positioning system (GPS), etc.

A typical CD-ROM/DVD drive has several key components, i.e., a media tray, an optical head and a spindle motor. The present invention space saving CD-ROM/DVD drive mechanism comprises an optical head and a spindle motor, where the spindle motor is now located adjacent to the periphery of the electronic device. The object is to eliminate the traditional media tray from the CD-ROM/DVD drive mechanism and further move the optical head and the spindle motor adjacent to the periphery of the mini notebook computer, where the CD-ROM/DVD drive mechanism is now configured as a pizza slice-shaped configuration. Specifically, the space saving CD-ROM/DVD drive mechanism now only takes up a small one-quarter (¼) area on the electronic device.

One of the advantages of the present invention is that instead of having only one CD-ROM/DVD drive mechanism, the electronic device can have a plurality of CD-ROM/DVD drive mechanisms incorporated with the electronic device. The present invention CD-ROM/DVD drive mechanism can further be utilized with a CD cartridge for retaining a media disc therein, where the CD cartridge extends partially into the electronic device to be interfaced with the optical head and the spindle motor while at the same time, extending outwardly from the electronic device for most of its space so that it does not take up space within the electronic device.

It is an object of the present invention to provide a space saving CD-ROM/DVD drive mechanism used with an electronic device that takes up a small one-quarter (¼) area on the electronic device, thereby saving space within the electronic device so that additional equipment can be added to the electronic device or so that the electronic device can be further reduced in size. The CD-ROM/DVD drive mechanism comprises an optical head and a spindle motor, where the spindle motor is located adjacent to the periphery of the electronic device so that a pizza slice-shaped configuration is incorporated with the electronic device.

It is an additional object of the present invention to provide a CD cartridge for retaining a media disc, where the CD cartridge partially extends into the electronic device to be interfaced with the optical head and the spindle motor while at the same time, extending outwardly from the electronic device for most of its space so that it does not take up space within the electronic device.

It is a further object of the present invention to provide a bar shaped structure with a CD-ROM/DVD drive mechanism embedded in the bar shaped structure, thereby saving space within an electronic device so that additional equipment can be added to the electronic device or so that the electronic device can be further reduced in size. The bar shaped CD-ROM/DVD drive mechanism comprises an optical head and a spindle motor, where the bar shaped drive mechanism is swung out from the electronic device when in use and pushed back into the electronic device when not in use.

In a first embodiment of the present invention, the space saving CD-ROM/DVD drive mechanism is now a pizza slice shaped configuration located adjacent to the periphery of the portable computer, a handheld GPS, etc.

In a second embodiment of the present invention, the space saving CD-ROM/DVD drive mechanism is embedded into a bar shaped arm structure which is pivotably connected to an electronic device, which can be swung out when in use or stored within the electronic device when not in use.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described briefly, the present invention is a space saving CD-ROM/DVD drive mechanism used with electronic devices, such as a portable mini notebook computer, a handheld global positioning system (GPS) or etc.

Figure 1:
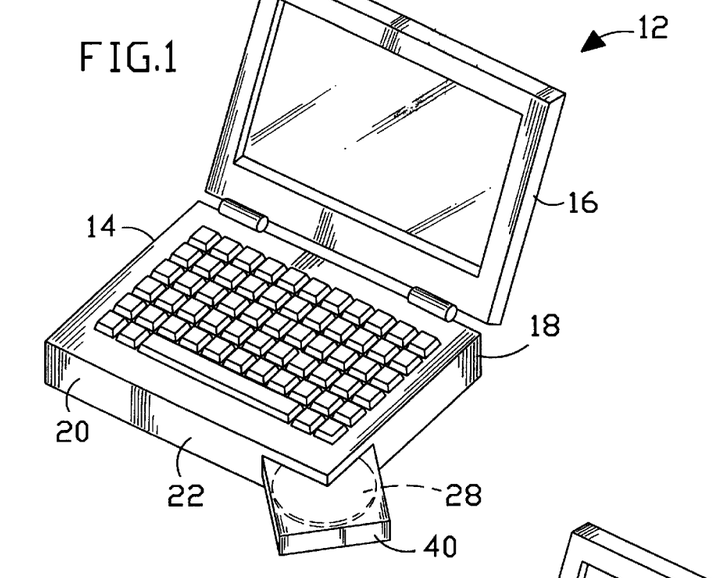
FIG. 1 is a perspective view of a first embodiment of the present invention space saving CD-ROM/DVD drive mechanism incorporated with a portable mini notebook computer, showing a CD cartridge which retains a media disc therein partially inserted into the notebook computer.

Referring to FIG. 1, there is shown at 10 a first embodiment of the present invention space saving CD-ROM/DVD drive mechanism installed within a portable mini notebook computer 12. The notebook computer 12 comprises a generally rectangular shaped main housing 14 and a display screen 16 hingeably connected to a rear 18 of the housing 14. The housing 14 has a periphery 20 and at least four sidewalls 22, wherein each sidewall has a thickness throughout the periphery 20 of the housing 14.

Figure 2:
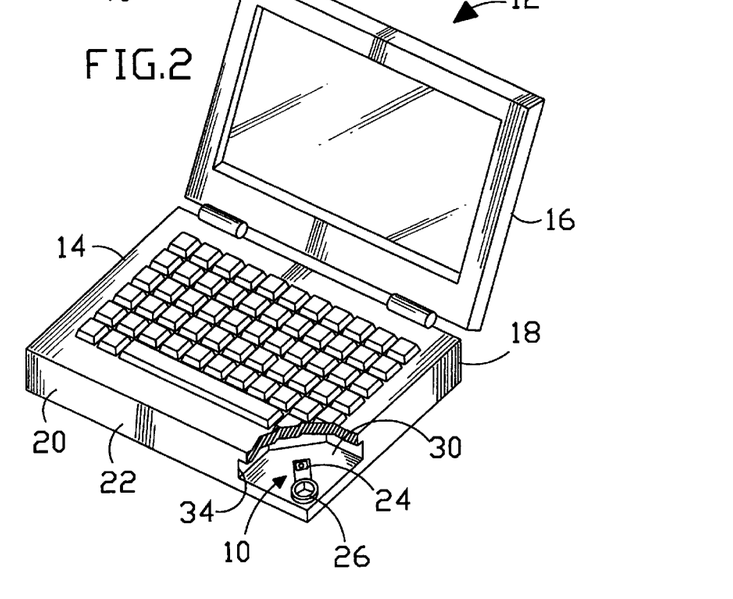
FIG. 2 is a perspective view of the present invention space saving CD-ROM/DVD drive mechanism shown in FIG. 1, with a portion thereof broken away to better illustrate the structural relationship of the components forming a part of the present invention.

Referring to FIGS. 1 and 2, one of the unique features of the present invention CD-ROM/DVD drive mechanism 10 is that it is located in a small area 30 within the housing 14 of the mini notebook computer 12. The CD-ROM/DVD drive mechanism 10 comprises an optical head 24 and a spindle motor 26, where the spindle motor 26 is located adjacent to the periphery 20 of the housing 14 of the portable computer 12 for rotating a media disc 28 while the optical head 24 is located remote from the spindle motor 26 closer within the housing 14 of the computer 12 for reading information on the media disc 28. The optical head 24 further comprises a laser light source, an optical system to focus the light onto a media disc recording layer and a detector to convert the light returning from the media disc to an electronic signal.

Figures 3, 10:
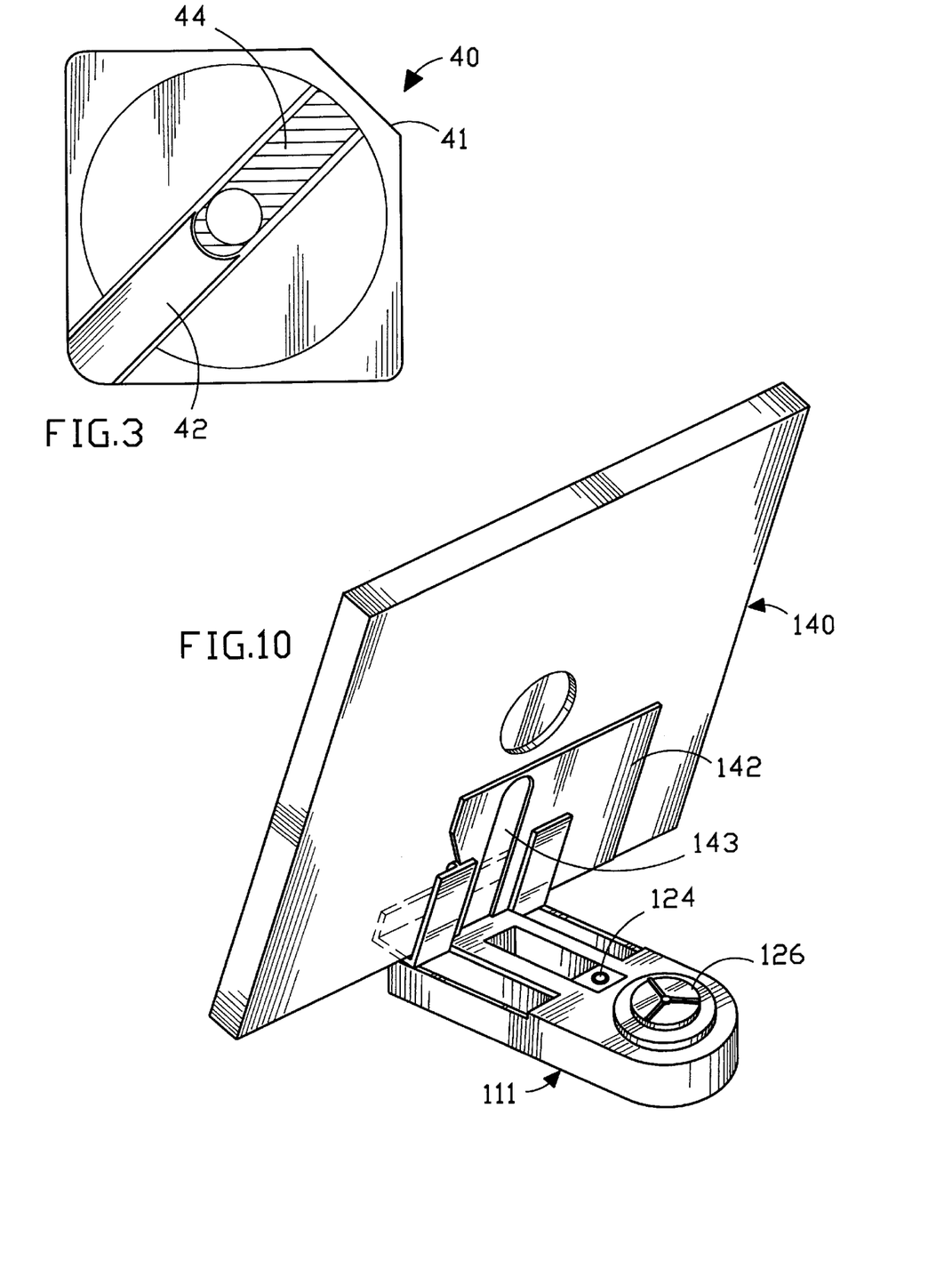
FIG. 3 is a bottom plan view of a CD cartridge utilized with the present invention space saving CD-ROM/DVD drive mechanism.
FIG. 10 is a perspective view of the CD cartridge loaded onto the bar shaped arm structure of the present invention space saving CD-ROM/DVD drive mechanism.

Referring to FIGS. 2 and 3, there is provided a CD cartridge slot 34 on a respective two of the at least four sidewalls 22 of the housing 14 and located at a distance which is half the thickness of a respective one of the least four sidewalls 22 for providing an access opening to the CD-ROM/DVD drive mechanism 10. The CD cartridge slot 34 is sized for receiving a CD cartridge 40 which retains the media disc 28 therein, such that the CD cartridge 40 partially extends into the housing 14 which is sightly more than the half the size of the CD cartridge 40 or if the CD cartridge 40 is not used it is slightly more than the radius of the media disc 28.

Referring to FIG. 3, there is shown a bottom plan view of the generally square shaped CD cartridge 40 which is further used with the present invention space saving CD-ROM/DVD drive mechanism 10 for retaining the media disc 28 therein such that the media disc 28 may be played within the CD cartridge 40. The CD cartridge 40 is used for protecting the media disc 28 and preventing a user from touching the spinning media disc 28 while spinning. The CD cartridge 40 has a 45° front end 41 and a sliding cover 42 which slides backward when the CD cartridge 40 is installed in the CD-ROM/DVD drive mechanism 10 (see FIG. 1), and thereby exposes a portion 44 of the media disc 28 to the optical head 24 for information to be read.

Figure 4:
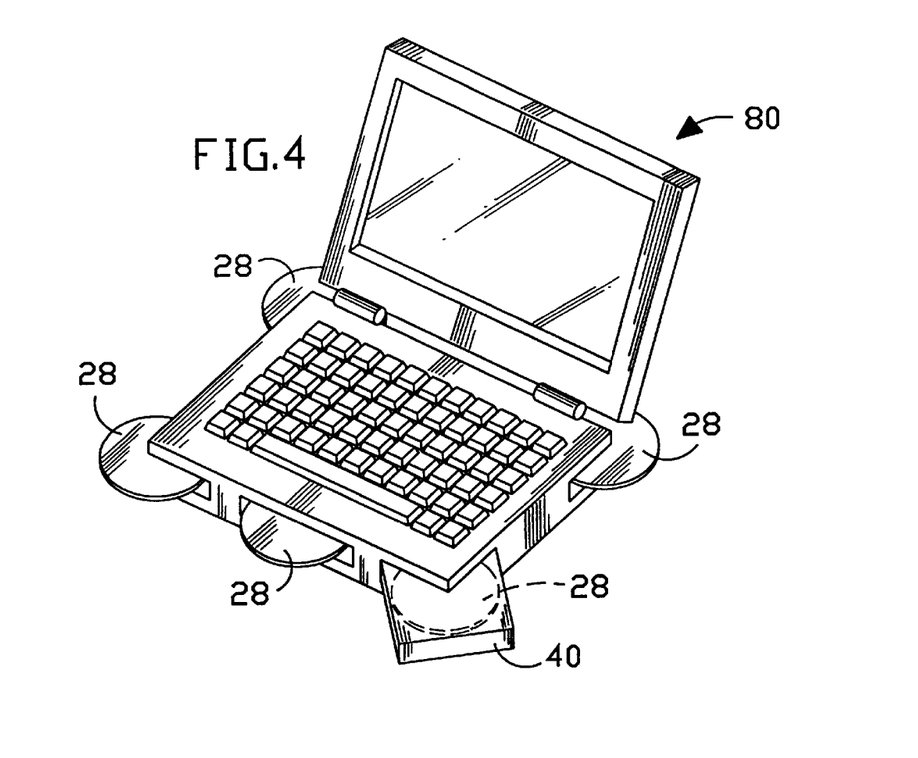
FIG. 4 is an illustrative view of a portable mini notebook computer, showing a plurality of space saving CD-ROM/DVD drive mechanisms incorporated with the notebook computer and a plurality of CD cartridges installed thereto.

Referring to FIG. 4, another unique feature of the present invention is that a plurality of space saving CD-ROM/DVD drive mechanisms can be used with only one portable notebook computer 80. It will be appreciated that the portable notebook computer 80 is not limited to one space saving CD-ROM/DVD drive mechanism. It is emphasized that while one space saving CD-ROM/DVD drive mechanism is utilized, it is also within the spirit and scope of the present invention to utilize a plurality of space saving CD-ROM/DVD drive mechanisms incorporated with the portable notebook computer 80 wherein a plurality of CD cartridges 40 are utilized (only one is shown inserted therein while a plurality of media discs 28 are installed therein).

Figure 5:
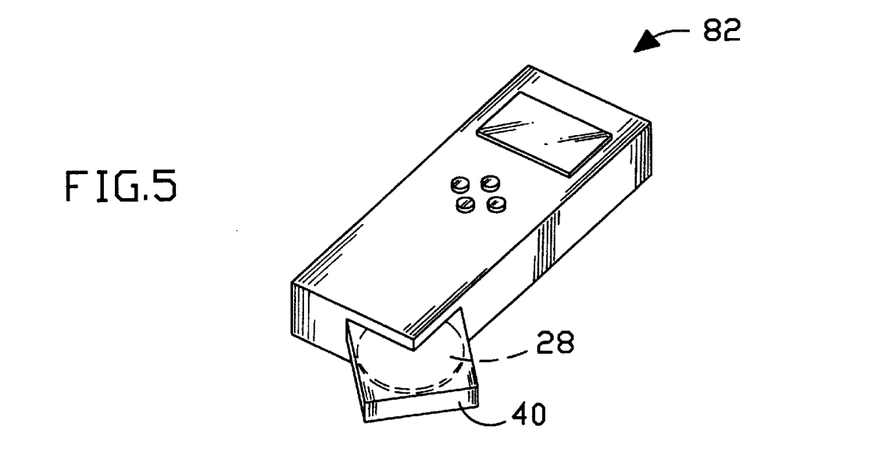
FIG. 5 is a perspective view of the present invention space saving CD-ROM/DVD drive mechanism incorporated with a handheld electronic device, showing a CD cartridge which retains a media disc inserted thereto.

Referring to FIG. 5, there is shown an electronic device 82, such as a handheld GPS, which utilizes the present invention space saving CD-ROM/DVD drive mechanism 10, where the CD cartridge 40 which retains the media disc 28 is inserted thereto.

Figure 6:
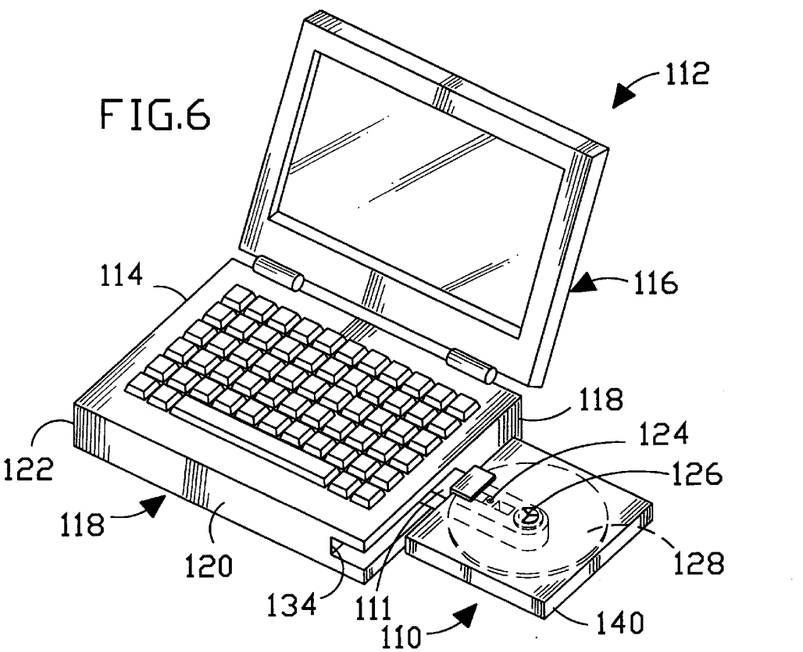
FIG. 6 is a perspective view of a second embodiment of the present invention space saving CD-ROM/DVD drive mechanism embedded within a bar shaped arm structure which is pivotally connected to a portable mini notebook computer.

Referring to FIG. 6, there is shown at 112 a portable mini notebook computer which utilizes a second embodiment of the present invention space saving CD-ROM/DVD drive mechanism 110, where the space saving CD-ROM/DVD drive mechanism 110 is incorporated with a bar shaped arm structure 111.

The notebook computer 112 comprises a generally rectangular shaped main housing 114 and a display screen 116 hingeably connected to a rear 118 of the housing 114. The housing 114 has a periphery 120 and at least four sidewalls 122, wherein each sidewall has a thickness throughout the periphery 120 of the housing 114.

Figure 7:
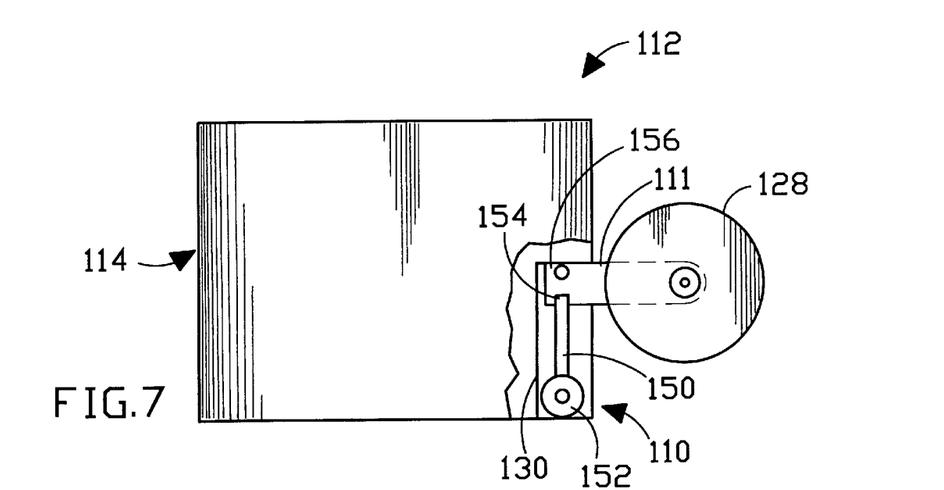
FIG. 7 is a top plan view of the bar shaped arm structure pivotally connected to a portable mini notebook computer, showing the bar shaped arm structure is deployed, with a portion thereof broken away to better illustrate the structural relationship of the components forming a part of the present invention.

Referring to FIGS. 6 and 7, one of the unique features of the present invention CD-ROM/DVD drive mechanism 110 is that it is located in a small area 130 within the housing 114 of the mini notebook computer 112. A support bar 150 has one end 152 fixed to the housing 114 of the computer 112 and the other end 154 also fixed to the housing 114 and hingeably connected to one end 156 of the bar shaped arm structure 111. The bar shaped arm structure 111 is pivotably connected to the support bar 150 such that it can swing outwardly away from the housing 114 as shown or it can be retracted and stored within the housing 114 of the computer 112. A CD cartridge slot 134 is provided on a respective two of the at least four sidewalls 122 of the housing 114 and located at a distance which is half the thickness of a respective one of the at least four sidewalls 122 for providing the storage compartment 130 to store the bar shaped arm structure 111 thereto.

The CD-ROM/DVD drive mechanism 110 comprises an optical head 124 for reading information on a media disc 128 and a spindle motor 126 for rotating the media disc 128, where the spindle motor 126 is located further away from the housing 114 when the CD-ROM/DVD drive mechanism 110 is in use while the optical head 124 is located adjacent to the housing 114. The optical head 124 further comprises a laser light source, an optical system to focus the light onto a media disc recording layer and a detector to convert the light returning from the media disc to an electronic signal.

Figure 8:
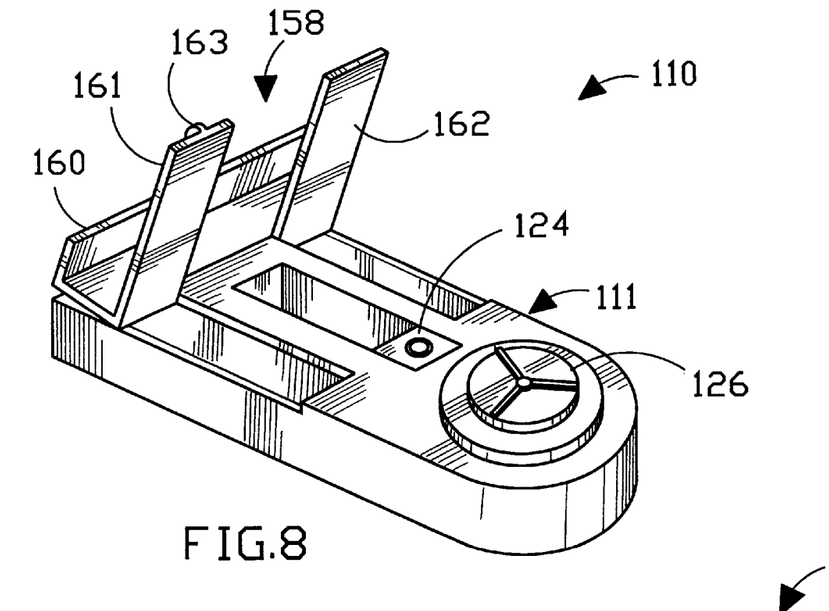
FIG. 8 is a perspective view of the present invention space saving CD-ROM/DVD drive mechanism embedded with the bar shaped arm structure.
Figure 9:
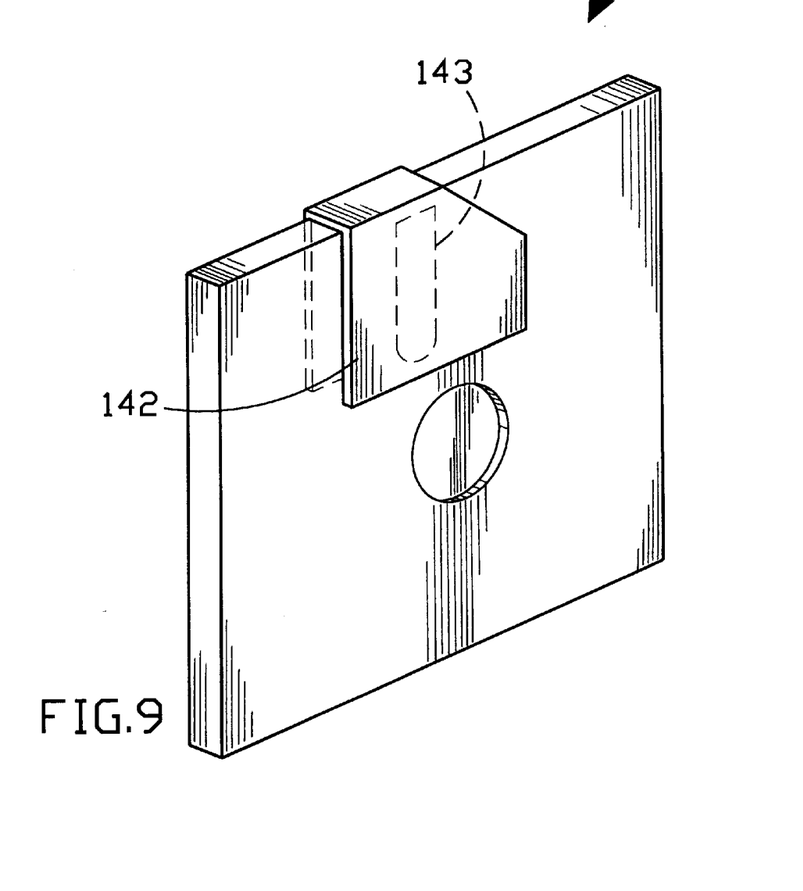
FIG. 9 is a perspective view of a CD cartridge used with the bar shaped arm structure of the present invention space saving CD-ROM/DVD drive mechanism.

Referring to FIGS. 8, 9 and 10, the bar shaped arm structure 111 has a cartridge loading adapter 158 which pops out from the structure 111 when the CD-ROM/DVD drive mechanism 110 is in use. The cartridge adapter 158 is released from the arm structure 111 and aimed at a 45° inclined angle for receiving a generally square shaped CD cartridge 140 (see FIG. 9) which retains the media disc 28 therein such that the media disc 28 may be played within the CD cartridge 140. The CD cartridge 140 is further used for protecting the media disc 128 and preventing a user from touching the spinning media disc 128 while spinning. The cartridge adapter 111 has a rear stopping engagement plate 160 and two opposite parallel guides 161 and 162 connected to the rear stopping engagement plate 160 for guiding the CD cartridge 140 in the correct position when loading the CD cartridge 140 on the cartridge adapter 158. At the same time, protruding activation means 163 is connected to one of the guides 161 which pushes open a trap door cover 142 on the CD cartridge 142, where the CD cartridge 140 opens a window 143 to expose a portion of the media disc 128 therein for the optical head 124 to read information from the media disc 128. The CD cartridge 140 protects the media disc 128 and prevents a user from touching the spinning media disc while spinning.

Figure 11:
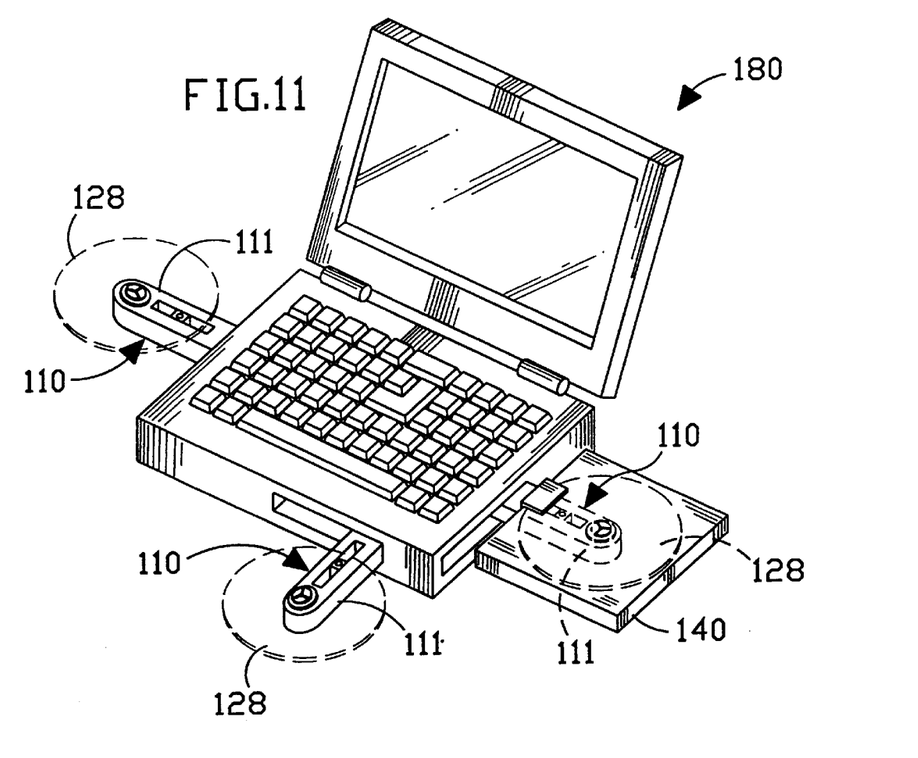
FIG. 11 is a perspective view of a plurality of bar shaped arm structures of the present invention space saving CD-ROM/DVD drive mechanism installed with a portable mini notebook computer.

Referring to FIG. 11, one of the unique features of the present invention is that a plurality of space saving CD-ROM/DVD drive mechanisms 110 can be used with only one portable notebook computer 180 as shown. It will be appreciated that the portable notebook computer 180 is not limited to one space saving CD-ROM/DVD drive mechanism. It is emphasized that while one space saving CD-ROM/DVD drive mechanism is utilized, it is also within the spirit and scope of the present invention to utilize a plurality of space saving CD-ROM/DVD drive mechanisms incorporated with the portable notebook computer 180 wherein a plurality of CD cartridge 140 are utilized (only one is shown inserted therein while a plurality of media discs 128 are installed therein.

It will also be appreciated that the present invention space saving CD-ROM/DVD drive mechanism may be used without using the CD cartridge 140 which retains the media disc 128. In this case, the media disc 128 is positioned on the bar shaped arm structure 111 as shown in FIG. 11.

Figure 12:
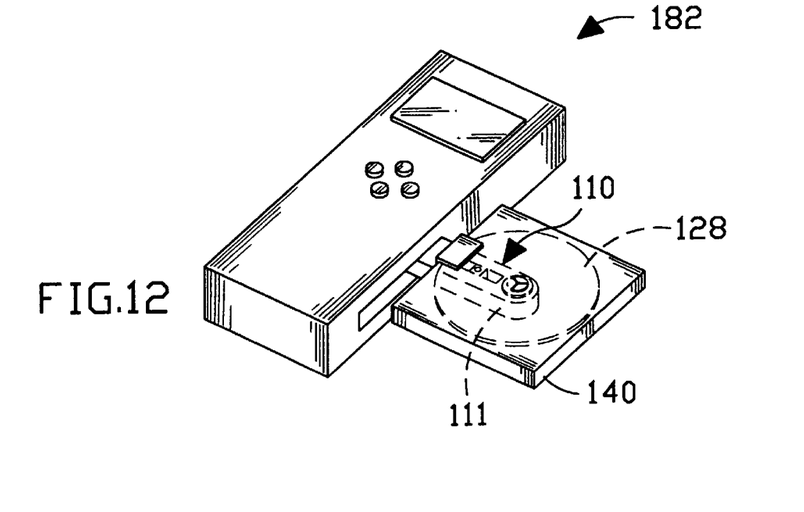
FIG. 12 is a perspective view of the bar shaped arm structure of the present invention space saving CD-ROM/DVD drive mechanism, incorporated with an electronic device.

Referring to FIG. 12, there is shown an electronic device 182, such as a handheld GPS, which utilizes the present invention space saving CD-ROM/DVD drive mechanism 110, where the CD cartridge 140 which retains the media disc 128 is inserted thereto.

Defined in detail, the present invention is a portable computer comprising: (a) a main housing having a generally rectangular shaped body with a periphery surrounding the body and at least four sidewalls, each sidewall having a thickness throughout the periphery of the housing; (b) a display screen hingeably connected to a rear of the body of the main housing; (c) a CD-ROM/DVD drive mechanism located within the body of the main housing and having an optical head and a spindle motor for rotating a media disc, where the spindle motor is located adjacent to the periphery of the main housing; and (d) a CD cartridge slot located on a respective two of the at least four sidewalls of the body at a distance which is half the thickness of a respective one of the at least four sidewalls for providing an access opening to the CD-ROM/DVD drive mechanism, the access opening having a size for receiving the media disc therein such that the media disc partially extends into the body of the housing which is sightly more than the radius of the media disc; (e) whereby the CD-ROM/DVD drive mechanism takes up a small area within the main housing of the portable computer.

Defined broadly, the present invention is a computing device comprising: (a) a main housing having a periphery and a sidewall with a thickness throughout the periphery of the main housing; (b) a CD-ROM/DVD drive mechanism located within the main housing and having an optical head and a spindle motor for rotating a media disc, where the spindle motor is located adjacent to the periphery of the housing; and (c) a CD cartridge slot located on the sidewall of the main housing at a distance which is half the thickness of the sidewall for providing an access opening to the CD-ROM/DVD drive mechanism, the access opening having a size for receiving the media disc therein such that the media disc partially extends into the main housing which is sightly more than the radius of the media disc; (d) whereby the CD-ROM/DVD drive mechanism takes up a small area within the main housing of the computing device.

Defined more broadly, the present invention is a CD-ROM/DVD drive mechanism used with an electronic device having a periphery, the mechanism comprising: (a) an optical head; (b) a spindle motor for rotating a media disc, the spindle motor being located adjacent to the periphery of the electronic device; and (c) an opening located adjacent to the spindle motor for providing access to the CD-ROM/DVD drive mechanism, such that the media disc partially extends into the electronic device which is sightly more than the radius of the media disc; (d) whereby the CD-ROM/DVD drive mechanism takes up a small area within the electronic device.

Defined alternatively in detail, the present invention is a portable computer comprising: (a) a main housing having a generally rectangular shaped body with a periphery surrounding the body and at least four sidewalls, each sidewall having a thickness throughout the periphery of the housing, a respective sidewall having a slotted opening therein; (b) a display screen hingeably connected to a rear of the body of the main housing; and (c) a CD-ROM/DVD bar shaped arm structure hingeably connected within the housing and located at the periphery and adjacent to the slotted opening, the bar shaped arm structure having a cartridge loading adapter, an optical head and a spindle motor, where the bar shaped arm structure can be swung outwardly away from the housing to a deployed position for receiving a CD cartridge containing a media disc and retractable into the housing to a stored position within the housing when not in use, the cartridge loading adapter having means for pushing away a trap door cover on the CD cartridge, thereby exposing a portion of the media disc to be read by the optical head; (d) whereby the CD-ROM/DVD bar shaped arm structure takes up a small area within the main housing of the portable computer.

Defined alternatively broadly, the present invention is a computing device comprising: (a) a main housing having a periphery and at least one sidewall with a thickness throughout the periphery of the housing, the at least one sidewall having an opening therein; and (b) a CD-ROM/DVD arm structure hingeably connected within the housing and located at the periphery and adjacent to the opening, the structure having a spindle motor for rotating a media disc and an optical head for reading information on the rotating media disc, where the arm structure can be swung outwardly away from the housing to a deployed position for receiving the media disc and retractable to a stored position within the housing when not in use; (c) whereby the CD-ROM/DVD arm structure takes up a small area within the main housing of the computing device.

Defined alternatively more broadly, the present invention is a CD-ROM/DVD drive mechanism used with an electronic device having a periphery opening, the mechanism comprising a structure hingeably connected to the electronic device and located adjacent to the periphery opening, the structure having a spindle motor for rotating a media disc and an optical head for reading information on the rotating media disc, where the structure can be swung outwardly away from the electronic device to a deployed position for receiving the media disc and retractable to a stored position to the electronic device when not in use, whereby the CD-ROM/DVD drive mechanism takes up a small area within the electronic device.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A portable computer comprising:
   a. a main housing having a generally rectangular shaped body with a periphery surrounding the body and at least four sidewalls, each sidewall having a thickness throughout the periphery of the housing;
   b. a display screen hingeably connected to a rear of said body of said main housing;
   c. a CD-ROM/DVD drive mechanism located within said body of said main housing and having an optical head and a spindle motor for rotating a media disc, where the spindle motor is located adjacent to periphery of said main housing; and
   d. a CD cartridge slot located on a respective two of said at least four sidewalls of said body at a distance which is half the thickness of a respective one of said at least four sidewalls for providing an access opening to said CD-ROM/DVD drive mechanism, the access opening having a size for receiving the media disc therein such that the media disc partially extends into and out of said body of said housing which is sightly more than the radius of said media disc while said CD-ROM/DVD drive mechanism is operating;
   e. whereby said CD-ROM/DVD drive mechanism takes up a small area within said main housing of said portable computer.

2. The portable computer in accordance with claim 1, further comprising a CD cartridge for retaining said media disc therein such that said media disc can be played within the CD cartridge.

3. The portable computer in accordance with claim 1, wherein said optical head further comprises a laser light source, an optical system to focus the light onto a media disc recording layer and a detector to convert the light returning from said media disc to an electronic signal.

4. The portable computer in accordance with claim 2, wherein said CD cartridge further comprises a slidable cover which is movable to expose a portion of said media disc within said CD cartridge.

5. A computing device comprising:
   a. a main housing having a periphery and a sidewall with a thickness throughout the periphery of the main housing;
   b. a CD-ROM/DVD drive mechanism located within said main housing and having an optical head and a spindle motor for rotating a media disc, where the spindle motor is located adjacent to said periphery of said housing; and
   c. a CD cartridge slot located on said sidewall of said main housing at a distance which is half the thickness of said sidewall for providing an access opening to said CD-ROM/DVD drive mechanism, the access opening having a size for receiving the media disc therein such that the media disc partially extends into and out of said main housing which is sightly more than the radius of said media disc while said CD-ROM/DVD drive mechanism is operating;
   d. whereby said CD-ROM/DVD drive mechanism takes up a small area within said main housing of said computing device.

6. The computing device in accordance with claim 5, further comprising a CD cartridge for retaining said media disc therein such that said media disc can be played within the CD cartridge.

7. The computer device in accordance with claim 5, wherein said optical head further comprises a laser light source, an optical system to focus the light onto a media disc recording layer and a detector to convert the light returning from said media disc to an electronic signal.

8. The computer device in accordance with claim 6, wherein said CD cartridge further comprises a slidable cover which is movable to expose a portion of said media disc within said CD cartridge.

9. A CD-ROM/DVD drive mechanism used with an electronic device having a periphery, the mechanism comprising:
   a. an optical head;
   b. a spindle motor for rotating a media disc, the spindle motor being located adjacent to said periphery of said electronic device;
   c. an opening located adjacent to said spindle motor for providing access to said CD-ROM/DVD drive mechanism, such that the media disc is partially extends into said electronic device which is sightly more than the radius of the media disc; and
   d. a CD cartridge for retaining said disc therein such that said disc can be played within the CD cartridge, the CD cartridge having a slidable cover which is movable to expose a portion of said disc within the CD cartridge;
   e. whereby said CD-ROM/DVD drive mechanism takes up a small area within said electronic device.

10. The CD/DVD drive mechanism in accordance with claim 9, wherein said optical head further comprises a laser light source, an optical system to focus the light onto a disc recording layer and a detector to convert the light returning from said disc to an electronic signal.

11. A portable computer comprising:
   a. a main housing having a generally rectangular shaped body with a periphery surrounding the body and at least four sidewalls, each sidewall having a thickness throughout the periphery of the housing, a respective sidewall having a slotted opening therein;
   b. a display screen hingeably connected to a rear of said body of said main housing; and
   c. a CD-ROM/DVD bar shaped arm structure hingeably connected within said housing and located at said periphery and adjacent to said slotted opening, the bar shaped arm structure having a cartridge loading adapter, an optical head and a spindle motor, where the bar shaped arm structure can be swung outwardly away from said housing to a deployed position for receiving a CD cartridge containing a media disc and retractable into said housing to a stored position within said housing when not in use, the cartridge loading adapter having means for pushing away a trap door cover on said CD cartridge, thereby exposing a portion of the media disc to be read by the optical head;

d. whereby said CD-ROM/DVD bar shaped arm structure takes up a small area within said main housing of said portable computer.

12. The portable computer in accordance with claim 11, wherein said optical head further comprises a laser light source, an optical system to focus the light onto a media disc recording layer and a detector to convert the light returning from said media disc to an electronic signal.

13. The portable computer in accordance with claim 11, wherein said pushing means includes protruding activation means which pushes open said trap door cover of said CD cartridge to expose the portion of the media disc therein for the optical head to read information from the media disc.

14. A computing device comprising:

a. a main housing having a periphery and at least one sidewall with a thickness throughout the periphery of the housing, the at least one sidewall having an opening therein; and b. a CD-ROM/DVD arm structure hingeably connected within said housing and located at said periphery and adjacent to said opening, the structure having a spindle motor for rotating a media disc and an optical head for reading information on the rotating media disc, where the arm structure can be swung outwardly away from said housing to a deployed position for receiving the media disc and retractable to a stored position within said housing when not in use;

c. whereby said CD-ROM/DVD arm structure takes up a small area within said main housing of said computing device.

15. The computing device in accordance with claim 14, further comprising a CD cartridge for retaining said media disc therein such that said disc can be played within the CD cartridge.

16. The computer device in accordance with claim 14, wherein said optical head further comprises a laser light source, an optical system to focus the light onto a media disc recording layer and a detector to convert the light returning from said media disc to an electronic signal.

17. The computing device in accordance with claim 15, wherein said CD cartridge further comprises a slidable trap door cover which is movable to expose a portion said media disc within said CD cartridge.

18. The computing device in accordance with claim 17, wherein said CD-ROM/DVD arm structure further comprises a cartridge loading adapter for receiving said CD cartridge containing said media disc therein and means for pushing away said trap door cover on said CD cartridge, thereby exposing the portion of said media disc to be read by said optical head.

19. A CD-ROM/DVD drive mechanism used with an electronic device having a periphery opening, the mechanism comprising a structure hingeably connected to said electronic device and located adjacent to said periphery opening, the structure having a spindle motor for rotating a media disc and an optical head for reading information on the rotating media disc, where the structure can be swung outwardly away from said electronic device to a deployed position for receiving the media disc and retractable to a stored position to said electronic device when not in use, whereby said CD-ROM/DVD drive mechanism takes up a small area within said electronic device.

20. The CD-ROM/DVD drive mechanism in accordance with claim 19, further comprising a CD cartridge for retaining said disc therein such that said disc can be played within the CD cartridge.

21. The CD-ROM/DVD drive mechanism in accordance with claim 19, wherein said optical head further comprises a laser light source, an optical system to focus the light onto a disc recording layer and a detector to convert the light returning from said disc to an electronic signal.

22. The CD-ROM/DVD drive mechanism in accordance with claim 20, wherein said CD cartridge further comprises a slidable cover which is movable to expose a portion said disc within said CD cartridge.

23. The CD-ROM/DVD drive mechanism in accordance with claim 22, wherein said structure further comprises a cartridge loading adapter for receiving said CD cartridge containing the media disc therein and means for pushing away a slidable cover on said CD cartridge, thereby exposing the portion of the media disc to be read by said optical head.

* * * * *